United States Patent [19]

Kern, Jr. et al.

[11] Patent Number: 5,116,159
[45] Date of Patent: May 26, 1992

[54] BALL AND SOCKET JOINT ASSEMBLY

[75] Inventors: Karle O. Kern, Jr., Reminerville; Dana A. Desko, Atwater, both of Ohio

[73] Assignee: Dana Corporation, Toledo, Ohio

[21] Appl. No.: 749,640

[22] Filed: Aug. 16, 1991

Related U.S. Application Data

[63] Continuation-in-part of Ser. No. 572,197, Aug. 23, 1990, abandoned.

[51] Int. Cl.⁵ .............................................. F16C 11/06
[52] U.S. Cl. ................................... 403/132; 403/133; 403/137; 29/898.044; 29/898.047
[58] Field of Search ............... 403/133, 132, 137, 138, 403/140, 143, 144, 125, 122, 135; 29/898.043, 898.048, 898.046, 898.044, 898.045, 898.047

[56] References Cited

U.S. PATENT DOCUMENTS

| | | |
|---|---|---|
| 3,656,221 | 4/1972 | Scheublein, Jr. et al. |
| 3,693,999 | 9/1972 | Wood Jr. |
| 3,711,136 | 1/1973 | Schmidt |
| 3,820,908 | 6/1974 | Maxeiner et al. ............ 403/133 |
| 3,950,006 | 4/1976 | Wood, Jr. ................. 403/133 X |
| 3,967,907 | 7/1976 | Schmidt .................. 403/125 X |
| 3,986,250 | 10/1976 | Belsdorf ................. 403/134 X |
| 4,163,617 | 8/1979 | Nemoto .................... 403/132 |
| 4,187,033 | 2/1980 | Zukowski ................... 403/137 |
| 4,203,683 | 5/1980 | Rogers .................. 403/135 X |
| 4,231,673 | 11/1980 | Satoh et al. ............... 403/125 |
| 4,478,531 | 10/1984 | Levinson et al. ......... 493/132 X |
| 4,597,150 | 7/1986 | Fister et al. ............... 29/407 |
| 4,606,668 | 8/1986 | Schmidt .................... 403/140 |
| 4,639,159 | 1/1987 | Amrath .................. 403/122 X |
| 4,875,794 | 10/1989 | Kern, Jr. ................... 403/132 |

Primary Examiner—Peter M. Cuomo
Attorney, Agent, or Firm—F. B. McDonald

[57] ABSTRACT

A ball and socket joint assembly incorporates an internal preload whereby a relatively constant torque may be realized over the useful life of the assembly. In a preferred form, the assembly includes a housing having a ball socket cavity, a ball, a pair of socket beraings supporting the ball, and a stud shaft integral with the ball. The housing defines an axis along which the socket bearings position and retain the ball for limited oscillatory movement within the housing. One socket bearing defines a ring through which the stud shaft extends for coupling to the tie rod end of a steering arm assembly. The other socket bearing is cup-shaped and formed of an extrudable plastic material. A radially oriented seat in the housing is adapted to support a conical disc spring washer interposed between the seat and the cup-shaped bearing. The conical washer is preferably a Belleville spring capable of providing a relatively constant force over a limited deflection range. Over the useful life of the joint assembly, the disc spring washer deflects while simultaneously maintaining a constant load on the ball and socket bearing components to eliminate lost motion along the axis due to wear.

9 Claims, 4 Drawing Sheets

BALL AND SOCKET JOINT ASSEMBLY

CROSS REFERENCE TO RELATED APPLICATION

This application is a continuation-in-part of application Ser. No. 572,197, filed Aug. 23, 1990 now abandoned.

BACKGROUND OF THE INVENTION

This invention relates to steering ball and socket joint assemblies for use in motor vehicles. More particularly, the invention relates to preloaded joint assemblies capable of maintaining relatively constant loading over their useful lives.

In designing a ball joint for use in steering linkage and suspension systems, an effort is typically made to provide a relatively constant rotating torque in the joint over its useful life. Normally a preload is applied to the joint during its manufacture to achieve an initial rotating torque value. However, over the useful life of the joint the torque value tends to decrease as result of wear, and wheel end lost motion and vibrations commensurately increase to the detriment of vehicular operation.

Attempts to overcome undesirable torque losses, hence to maintain given preload values, are legion. As one example, coil springs have bee positioned within ball socket cavities to continuously urge bearing members against balls during useful lives of joint assemblies. However, as coil springs have relatively low compressive elastic moduli, the torques can rarely be set sufficiently high enough to meet desired values without exceeding size and space limits. Moreover, because the compressive load capacity of a coil spring varies with extension of the spring, a gradual reduction of bearing contact load, and hence rotating torque, occurs as direct result of dimensional changes due to wear.

Finally, prior art processes employed in the manufacture of prior art ball and socket joint assemblies have been inherently plagued with substantial deviations in initial preload, hence torque, values. Thus, ball joints have rarely been manufactured with satisfactory consistency in rotating torque values to begin with.

SUMMARY OF THE INVENTION

The ball and socket joint assembly and method disclosed herein provide an improved preload system in which a relatively consistent torque may be achieved in spite of substantial tolerance variations in initial dimensions of the assembled parts. Moreover, the initial preload value now consistently achievable is also now consistently maintained over the useful life of the joint.

In a preferred form, a preloaded ball and socket joint assembly incorporates a housing having a first interior bore adapted to receive a ball and pair of socket bearings which encase and support the ball for oscillatory movement of the ball within the bearings. A stud shaft is integrally fixed to the ball, the shaft having an end adapted for threaded connection to the tie rod end of a steering arm.

A second interior bore in the housing is concentric and contiguous with the first bore, the second bore having a smaller diameter which, unlike the first bore, is threaded. An interface between first and second bores defines an annular seat which faces the ball and socket receiving end of the housing. One of the pair of socket bearings defines a cup bearing adapted to receive and support the top or upper portion of the ball. The cup bearing is made of a plastic material, preferably one capable of extrusion under the forces required to satisfactorily preload the ball joint assembly during manufacture.

During the useful life of the assembly, a disc spring washer maintains the "built-in" or initial factory preload of the joint assembly. The washer has a conical shape which defines a convex side which bears against the plastic cup bearing, and a concave side which faces the annular seat. An outer circumferential portion of the concave side of the washer bears directly against the seat at all times. The disc spring washer is of a type which provides a relatively constant load over a major portion of its deflection, which ranges up to 20-25 thousandths of an inch. In a preferred form, the assembly will maintain an approximately 300 PSI compressive preload over the useful life of the joint. Such preload will thus be effective to eliminate an otherwise 10 to 15 thousandths inches of cumulative axial lost motion due to wear.

DETAILED DESCRIPTION OF PREFERRED EMBODIMENTS

Figure 1:
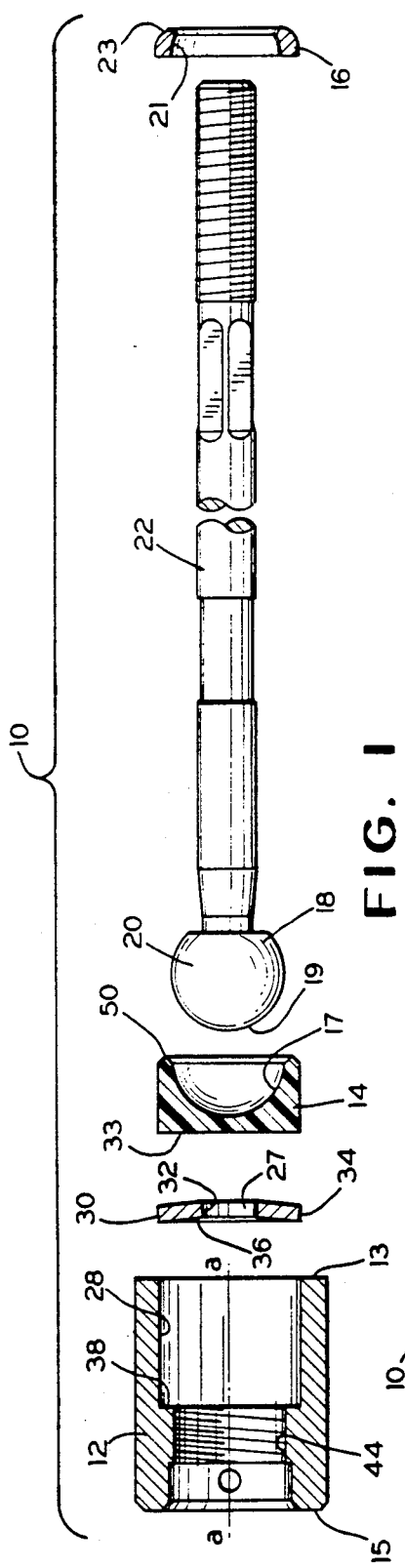
FIGS. 1, 2, and 3 display one preferred embodiment of the ball and socket joint assembly of the present invention in various stages of manufacture.
Figure 2:
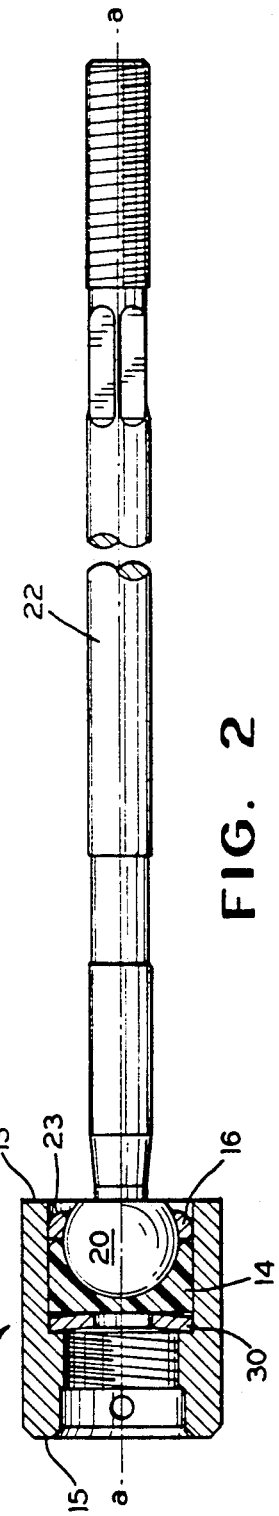
Figure 3:
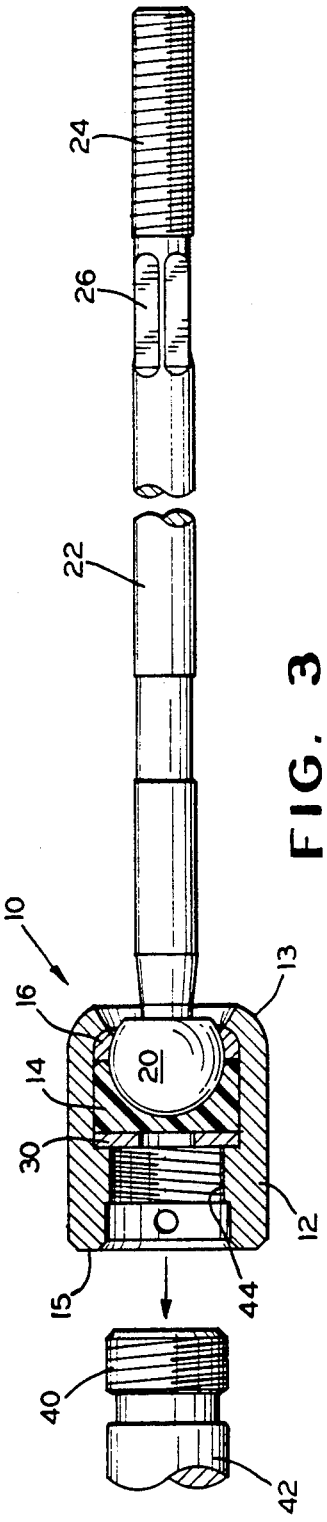

Referring initially to FIGS. 1-3, a ball joint assembly 10 incorporates a cylindrical steel housing 12 adapted to receive an interior or "top" socket bearing 14. The latter bearing, also referred to as a "cup" bearing, has a hemispherically shaped concave bearing surface 17 designed to receive a hardened ball 20 affixed to an elongated ball stud shaft 22, as shown. The bearing 14 is formed of an extrudable material, preferably a plastic. The ball 20 is installed through a socket receiving end 13 of the housing 12, into a first interior bore 28 thereof which defines an unthreaded cylindrical surface. The latter bore is sized for receiving, without sidewall interference, the cup bearing, ball, and other members as described herein.

An exterior or "bottom" socket bearing is defined by a ring bearing 16, preferably formed of steel. Thus, the upper portion or top 19 of the ball 20 engages the concave hemispherical surface 17 of the cup bearing 14, while the bottom 18 of the ball 20 engages a concave annular bearing surface 21 of the ring bearing 16. Those skilled in the art will appreciate that wheel end imposed loads on the stud shaft 22 during vehicular operation will cause the ball to oscillate within the cup and ring bearings 14 and 16, respectively.

The cylindrical housing 12 further defines an axis a—a, along which the various components of the ball joint and socket assembly are installed. The above-referenced first interior bore 28 extends between the socket receiving end 13 of the housing and an annular seat 38 adapted to accommodate a conical disc spring washer 30. During manufacture, the disc spring washer, formed of steel, is the first member to be installed into the housing 12, and is placed within the bore 28 with its concave side against the seat 38. An outer circumferential portion 34 of the spring washer 30 will bear against the seat 38 at all times. The convex side of the spring washer 30 is positioned to directly engage the external bottom 33 of the cup bearing 14, the latter bearing being installed after the washer 30. The inner circumference 32 of the spring washer defines a central aperture 27 which provides an annular seat for the bearing bottom 33.

The stud shaft 22, which contains the ball 20, is next positioned so as to install the ball into the concave hemispherical bearing surface 17 of the cup bearing 14. This procedure is followed by installation of the ring bearing 16 over the threaded end 24 of the stud shaft 22 and against the bottom 18 of the ball 20.

After installation of the components as described, an internal preload is applied to the assembly as a final step. The preload operation produces (as a by-product) the "rounded" end 13 on the housing 12, as depicted in FIG. 3. (Compare with FIGS. 1 and 2). It is thus apparent to those skilled in the art that pressures applied to preload the joint will cause the end 13 of the steel housing 12 to become plasticly deformed against the rounded backside 23 of the ring bearing 16. A hydraulic press, preferably utilized for this purpose, has a closing die affixed thereto, and is adjusted to exert a force sufficient to bend the end 13 (FIG. 2) of the housing about the backside 23 until a predetermined amount of load is exerted on the assembly. The load should be sufficient to entirely flatten the conical disc spring washer 30; however, the load will vary depending upon the sizes and configurations of the assemblies being manufactured. When such predetermined load is reached, the closing dye is retracted, but the assembly will yet retain the preload.

As earlier suggested, the cup bearing 14 is preferably formed of an extrudable non-metallic material, such as a resilient plastic, which will deform within the housing to accommodate tolerance variations. The amount of preload realized will be a function of the force curve of the particular disc spring washer utilized. To the extent that the spring washer becomes fully flattened in the process, a uniform preloading of the joint will be achieved, regardless of variations in size and shape of the joint components.

Figure 4:
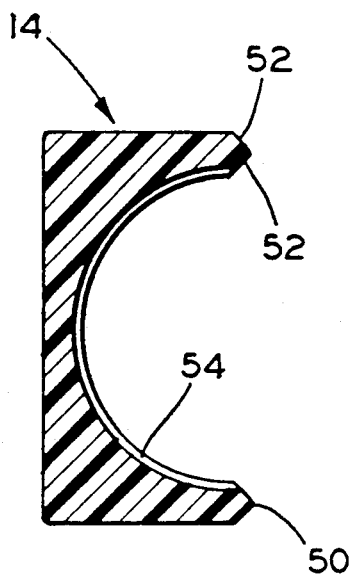
FIGS. 4 and 5 are cross-sectional and face views, respectively, of a preferred embodiment of a top socket bearing constructed in accordance with the present invention.
Figure 5:
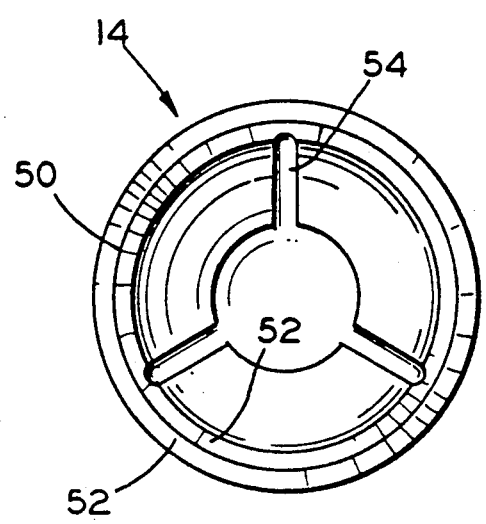

Referring now to FIGS. 4 and 5, enlarged detailed views of a presently preferred form of the cup bearing 14 are shown. The bearing 14 incorporates a lube groove channel 54, designed to receive a single lifetime charge of lubricant during manufacture of the joint assembly. In the same preferred form, the bearing 14 defines an annular edge or rim 50 having chamfered edges 52 for facilitating extrusion of the plastic upon the forming of the joint during preload. "Chamfering" the edges as shown permits greater dimensional tolerance variations than if the edges are "square" prior to the extrusion process. The chamfer thus offers a greater extrusion capacity for any given set of dimensional tolerances.

Referring now back to FIG. 3, the finished ball and socket joint assembly 10 of the present invention incorporates a second interior bore 44 which is internally threaded, and which has a smaller diameter than the first interior bore 28. The second bore accommodates an externally threaded stud 40 of the rack 42 (shown only partially) of a rack and pinion steering system (not shown). The stud 40 is installed through the end 15 of the housing 12 opposite the die-formed end 13 (FIG. 3).

EXAMPLE

One prototyped and successfully tested preferred embodiment of the present invention incorporated a steel housing 12 having a length of 1.75 inches. (All part dimensions as herein specified are approximate.) The housing had an exterior diameter of 1.3 inches and an interior diameter of 1.03 inches. The cup bearing 14 was formed of a molybdenum-filled nylon plastic which adds a self-lubricating feature. The conical disc spring washer 30 was a Belleville washer having an outside diameter of 0.98 inch and an inside diameter of 0.48 inch. The material thickness of the Belleville was 0.059 inch. The spring washer comprised a C-1075 plain carbon steel, and had a compressive deflection total of 0.0218 inch at a maximum load of 917 pounds. Maximum stress at 100 percent deflection was 307 pounds per square inch. Having a relatively flat load curve, the Belleville was capable of producing a relatively constant 300 pounds per square inch over a deflection range of 15 to 20 thousandths of an inch.

The ring bearing 16 was formed of a heat treated steel having a Rockwell hardness of 42 to 45, and dimensions of 1.0 inch external diameter and 0.72 inch internal diameter. The ball 20 was hardened and highly polished to provide a smooth "frictionless" surface for oscillation within the socket bearings 14 and 16.

Figure 6:
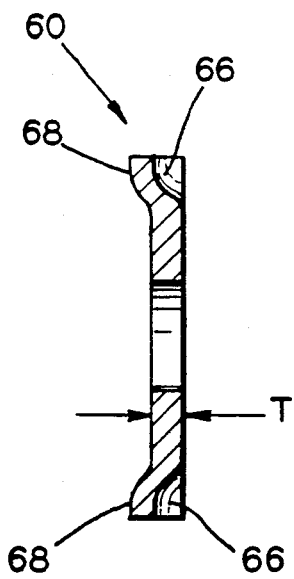
FIGS. 6 and 7 are side and face views, respectively, of a flat washer employed in a second preferred embodiment of the present invention.
Figure 7:
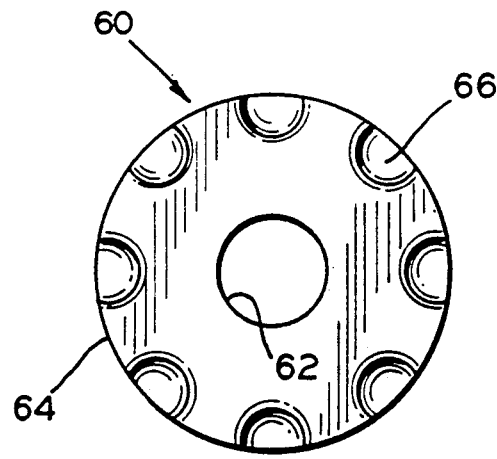
Figure 8:
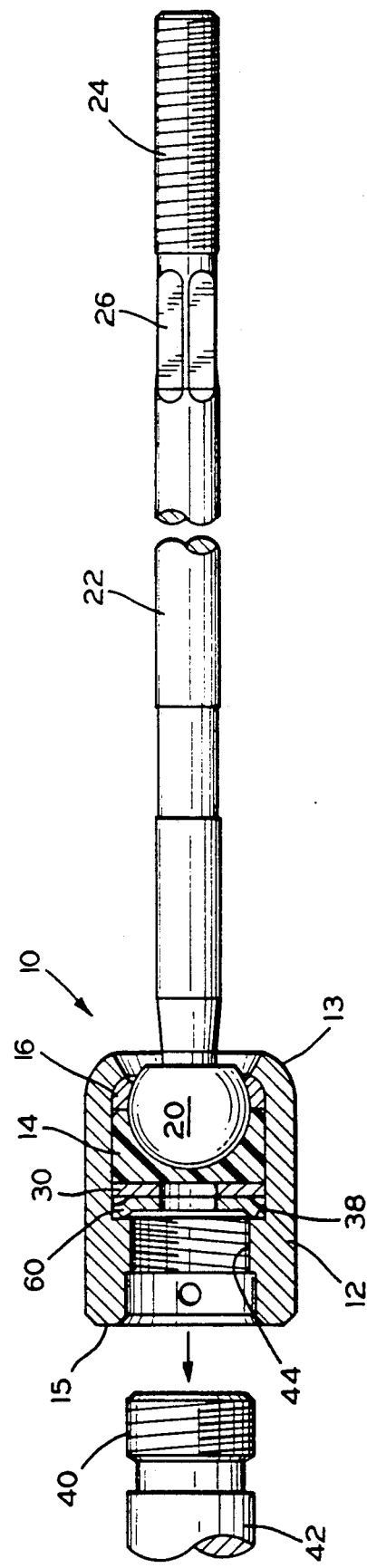
FIG. 8 is a view, analogous to that of FIG. 3, of the second preferred embodiment.

A generally planar, or non-conical, washer 60 shown in FIGS. 6 and 7 now provides basis for description of a second or alternate preferred embodiment. The washer 60, which does not function as a spring, may be interposed between the seat 38 (FIG. 1) and the conical disc spring washer 30 to provide a means for protecting the preloaded washer 30 (FIG. 3) from displacement as a result of inserting the stud 40 too far into the second bore 44, via the threaded connection shown. The inventors have determined that a possibility of "over-torquing" the stud 40 in the bore 44 could in some cases result in displacement of the conical disc spring washer 30 from its seat 38. The spring washer 30 would thus be rendered ineffective to operate as designed. To eliminate this possibility, the planar washer 60 may be spot welded at a plurality of truncated circular detents 66 (FIG. 7) directly to the seat 38 prior to installation of the spring washer 30. A preferred form of the washer 60 contains an inner circumference 62 and an outer circumference 64 as shown containing a plurality of uniformly spaced stamped, axially offset detents 66 (FIG. 6). The outer circumference has a slightly smaller diameter than the first interior bore 28 of the housing 12, for the purpose of avoiding interference upon installation. The washer 60 is installed (see FIG. 8) so that the offset backsides 68 of the detents engage the seat 38 of the housing 12 (FIG. 1) for spot welding the washer 60 directly to the seat.

Because the thickness "T" of the washer 60 must be sufficient to avoid distortion by the stud 40 under an over-torqued condition, the latter dimension will vary on a case-by-case basis as a function of the dimensions of other system parts. Obviously the diameter of the inner circumference 62 should be less then the diameter of the stud 40. In the example above, the stud 40 had a diameter of 0.9 inch, while the diameter of the inner circumference 62 was 5/16 of an inch.

A third embodiment of the present invention is now described with reference to FIGS. 9 and 10. The ball joint assembly 10' incorporates a cylindrical steel housing 12' which offers an alternate means of protection for the preloaded spring washer 30' from possible displacement resulting from over-insertion of the stud 40. The housing 12' incorporates an integral annular baffle 70 which defines a compound seat structure having opposed seats 38' (analogous to seat 38 of the first two described embodiments) and seat 73. The seat 73 faces oppositely of seat 38' along axis A—A for limiting the amount of axial insertion of the externally threaded stud 40 (see FIG. 3). In this manner the baffle 70 functions to protect the spring washer 30', as the washer 60 of the second embodiment functions to protect the spring washer 30.

Figure 9:
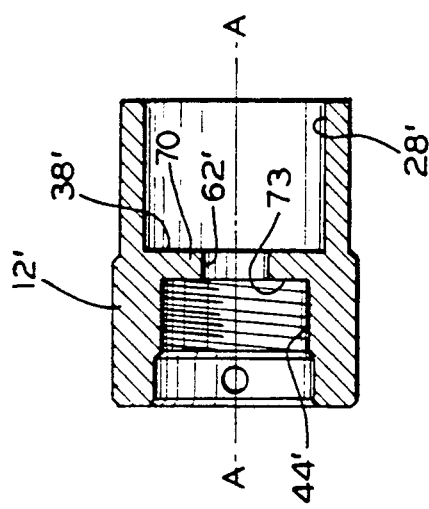
Figure 10:
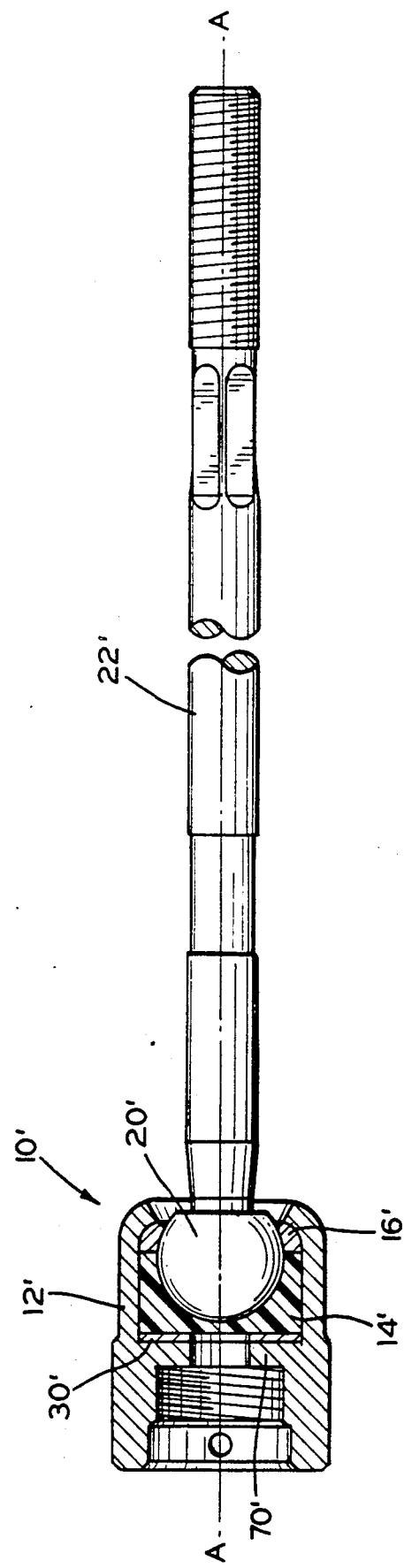

Those skilled in the art will appreciate that the aperture 62' of the baffle 0 of the third embodiment in FIG. 9, and the aperture or inner circumference 62 of the washer 60 of the second embodiment, can be sized to enable either disc spring washer 30, 30' to be installed with its inner circumference acting as an annular seat either against the bearing bottom 33 (FIG. 1) or oppositely against the washer 60 or baffle 70, as appropriate. The additional flexibility of inserting the washer 30, 30' either way enhances manufacturing flexibility of the joint assembly 10, 10'.

Although only two preferred embodiments have been detailed and described herein, the following claims envision numerous additional embodiments which will fall within the spirit and scope thereof.

What is claimed is:

1. In a ball and socket joint assembly including a ball, a cylindrical housing adapted to contain said ball, said housing defining an axis, and having first and second axially spaced ends, said housing comprising a radially extending annular first seat between said ends, said housing containing said ball between said first end and said first seat, said first seat facing said end, an elongated ball stud fixed to said ball, said stud extending outwardly through said first end of said housing, first and second axially opposed socket bearings rigidly supported within said housing and adapted to position said ball for limited oscillatory movement of said ball, and means disposed between said first seat and said first socket bearing for providing an internal axial preload on said first socket bearing against said ball and, in turn, on said ball against said second socket bearing; an improvement wherein said housing comprises first and second adjoining coaxial interior bores, each of said bores communicating with an axially fixed, nonadjustable annular member extending radially between said bores and defining an aperture therethrough, said member defining said first seat, and wherein said means for providing said internal preload comprises a conical spring washer having a central aperture comprising an annular second seat, and wherein said aperture of said annular member is concentric with, but sized equal to or smaller than, said aperture of said washer, said first socket bearing formed of an extrudable plastic composition and comprising a concave seat bounded by an annular rim, said rim comprising a chamfered annular extremity, wherein said rim becomes flattened against said second socket bearing upon preloading of said joint assembly.

2. The joint assembly of claim 1 wherein said preload is relatively constant over the useful life of said joint assembly, and whereby relative linear lost motion between joint assembly parts due to wear along said axis is substantially eliminated.

3. The joint assembly of claim 2 wherein said conical spring washer axially deflects to maintain said relatively constant preload on said joint assembly components as wear occurs in said first and second socket bearings of said ball and socket joint assembly.

4. The joint assembly of claim 3 wherein said preload is maintained over an axial deflection range of at least 20 thousandths of an inch.

5. The joint assembly of claim 4 wherein said preload has a value of at least 300 pounds per square inch over said deflection range.

6. The joint assembly of claim 5 wherein said conical spring washer is a Belleville washer.

7. The joint assembly of claim 6 wherein said first socket bearing comprises a material composition of molybdenum-filled nylon plastic.

8. The joint assembly of claim 7 wherein said annular member is integrally formed as part of said cylindrical housing and wherein said first and second bores are axially spaced apart by said annular member.

9. A method of forming a ball and socket joint assembly includes the steps of:
(1) forming a cylindrical housing, said housing including first and second coaxial bores, said first bore spaced from second bore by an internal annular baffle integral with said housing, said baffle being axially and nonadjustably fixed within said housing,
(2) inserting a spring washer into said first bore against said annular baffle,
(3) inserting a cup bearing against the spring washer with the bottom of the cup bearing placed flatly against the spring washer, the cup bearing comprising a chamfered annular rim, inserting a ball and stud shaft assembly ball-first into the cup of said cup bearing,
(4) inserting a ring bearing into said first bore against the bottom of said ball about said stud shaft and against said rim, and
(5) placing said resultant assembly into a die and applying pressure to the end of said housing containing said first bore, said pressure being sufficient to flatten said spring washer in order to pre-load said ball and socket joint assembly, said pressure being applied up to a pre-set limit, whereby said rim comprises greater extrusion capacity for a given set of dimensional tolerances between said ball, bearings, and housing, said rim becoming distorted by said ring bearing upon the preloading of said joint assembly.

* * * * *